(12) United States Patent
Smith, III

(10) Patent No.: US 6,202,691 B1
(45) Date of Patent: Mar. 20, 2001

(54) UNDERSEA HYDRAULIC COUPLING WITH BLEED PORT

(75) Inventor: Robert E. Smith, III, Missouri City, TX (US)

(73) Assignee: National Coupling Company Inc., Stafford, TX (US)

( * ) Notice: Subject to any disclaimer, the term of this patent is extended or adjusted under 35 U.S.C. 154(b) by 0 days.

(21) Appl. No.: 09/569,858

(22) Filed: May 12, 2000

(51) Int. Cl.[7] ................................................. F16L 37/28
(52) U.S. Cl. ................... 137/614.04; 251/149.7; 285/108; 285/111; 285/917
(58) Field of Search ............... 137/614, 614.04; 251/149.7; 285/108, 111, 917

(56) References Cited

U.S. PATENT DOCUMENTS

| | | |
|---|---|---|
| 2,599,935 | 6/1952 | Pasker . |
| 2,727,761 | 12/1955 | Elliott et al. . |
| 2,772,898 | 12/1956 | Seeler . |
| 3,056,423 | 10/1962 | Lieser . |
| 3,291,152 | 12/1966 | Comer . |
| 3,507,523 | 4/1970 | Cadley . |
| 3,618,690 | 11/1971 | Johnson . |
| 3,730,221 | 5/1973 | Vik . |
| 3,777,771 | 12/1973 | De Visscher . |
| 4,222,411 | 9/1980 | Herzan et al. . |
| 4,253,683 | 3/1981 | Jentsch et al. . |
| 4,582,295 | 4/1986 | Kugler et al. . |
| 4,745,948 | 5/1988 | Wilcox et al. . |
| 4,754,780 | 7/1988 | Smith, III . |
| 4,813,454 | 3/1989 | Smith, III . |
| 4,832,080 | 5/1989 | Smith, III . |
| 4,858,648 | 8/1989 | Smith, III et al. . |
| 4,949,745 | * 8/1990 | McKeon ........................ 137/614 X |
| 5,099,882 | 3/1992 | Smith, III . |
| 5,203,374 | 4/1993 | Smith, III . |
| 5,277,225 | 1/1994 | Smith . |
| 5,360,035 | 11/1994 | Smith . |
| 5,390,702 | * 2/1995 | Smith, III ..................... 137/614.04 |
| 5,469,887 | 11/1995 | Smith, III . |
| 5,692,538 | 12/1997 | Smith, III . |

* cited by examiner

*Primary Examiner*—Kevin Lee
(74) *Attorney, Agent, or Firm*—Fulbright & Jaworski

(57) ABSTRACT

An undersea hydraulic coupling has a bleed port for seawater external to the coupling to enter the bore of the female coupling member when the male member is partially withdrawn from the female member. A ring-shaped radial seal positioned between the coupling members allows fluid to enter through the bleed port and flow into the bore, while sealing against the flow of hydraulic fluid out of the coupling. The bleed port and ring-shaped radial seal provide for seawater to fill the vacuum between the coupling members when they are separated, thereby decreasing the separation force required.

19 Claims, 3 Drawing Sheets

UNDERSEA HYDRAULIC COUPLING WITH BLEED PORT

BACKGROUND OF THE INVENTION

1. Field of the Invention

This invention relates in general to hydraulic couplings, and specifically to hydraulic couplings used in undersea drilling and production applications. More particularly, this invention involves a hydraulic coupling having a bleed port allowing seawater to enter the bore of the female coupling member during disassembly.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end, and a relatively small diameter longitudinal bore at the other. The small bore facilitates connection to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

In the use of undersea couplings, the male and female members may be interconnected or disconnected while the coupling remains underwater, either manually by a diver or automatically by a diverless system such as a remote operating vehicle (ROV) as is well known to those skilled in the art. The male member and the female member are generally connected to opposing plates of a manifold and are held together by bolts or hydraulic members attached to the plates of the manifolds. The male member is commonly attached to one plate, while the female member is attached to an opposing plate so as to face the male member and align with it. The male member and female member may be attached to the manifold plates using various means, such as set screws or threads. Techniques for attaching the members to such manifold plates are well known to those skilled in the art.

In couplings of the foregoing type, one or both coupling members may include a poppet valve which opens to allow fluid flow, and closes against a valve seat within the coupling member to arrest the flow. Generally, the poppet valves are spring-biased to the closed position. The poppet valves each include a valve actuator which may be a nose or stem extending from the apex of the valve face along the longitudinal axis of the poppet valve.

Undersea hydraulic couplings of the foregoing type are connected and disconnected while subsea. In emergency situations, for example, storms, hurricanes, etc., the coupling members must be quickly disconnected and one of the members, typically the female member, removed from the subsea location. When the male member is withdrawn from the large central bore of the female member, there is a resulting low pressure area or vacuum created within the bore. The vacuum increases the difficulty of disengaging the male member from the female member of the coupling. This resistance to disengagement due to the vacuum is magnified when multiple couplings and manifold plates are disengaged. In recent years, undersea drilling and production is at increasingly greater depths, i.e., 5,000 or more feet below sea level.

At greater ocean depths, the hydraulic pressure of the system of which the coupling is a part must be greater. For example, the pressure of the hydraulic system typically must exceed the pressure of the hydrocarbon in the well bore. In subsea applications at increased internal pressures, it is necessary to prevent leakage of hydraulic fluid from the system while the coupling members are engaged or disengaged. Therefore, one or more seals are used for the junction between the coupling members. Specifically, elastomeric seals and pressure-energized metal seals have been used in undersea hydraulic couplings.

In U.S. Pat. No. 4,813,454 to Robert E. Smith III, an undersea coupling with pressure balancing ports is shown. The male member of the coupling includes at least one balancing port communicating between the leading face and outer sidewall. When the male member is sealed in relation to the annular elastomeric seal in the receiving chamber of the female member, and the poppet valves of each member are closed, the balancing port is used to bleed sea water into or out from the annulus between the coupling members.

In U.S. Pat. No. 5,469,887 to Robert E. Smith III, a hydraulic coupling with a pressure equalizing valve is shown between the central bore or receiving chamber of the female member and the external surface of the female member. A valve in the passage allows sea water to flow into the annulus during connection or disconnection of the male and female coupling members, thus equalizing the pressure and preventing implosion of seals during disconnection of the coupling members.

SUMMARY OF THE INVENTION

The present invention resides in a hydraulic undersea coupling of the foregoing type, including male and female members for fluid communication therebetween and a ring-shaped seal retained in the female member by a seal retainer. The female member includes a bleed port with a second ring-shaped seal to allow sea water to enter through the bleed port and flow through an annulus into the female member bore when the male member is partially withdrawn from the bore. The radial seal is positioned between the seal retainer and female member body, and prevents hydraulic fluid from escaping the coupling through the annulus and out the bleed port. The bleed port acts as a vacuum break to fill the vacuum in the bore as the male member is being removed from the female member bore. The present invention also reduces the force necessary to remove the male member from the female member bore.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF PREFERRED EMBODIMENTS

Figures 1, 1A:
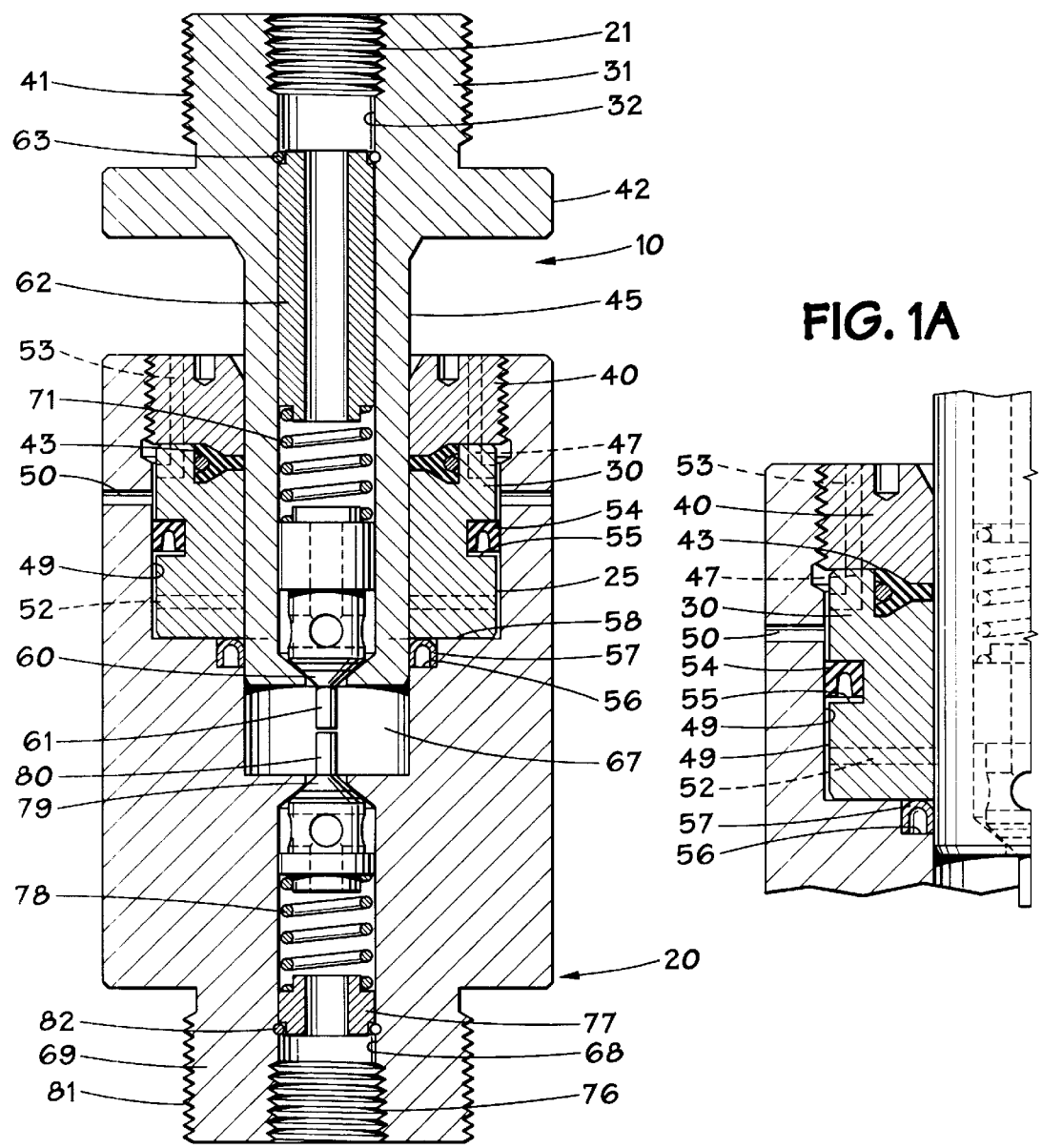
FIG. 1 is a sectional view of the male and female coupling members according to a first embodiment of the present invention with the male member partially removed from the female member bore.
FIG. 1A is a sectional view of the bleed port and seal according to a preferred embodiment of the present invention.

A first preferred embodiment of the present invention, shown in FIG. 1, comprises male member 10, female member 20, seal retainer 30 and retainer locking member 40. When the male member is inserted into the female member receiving chamber 67, fluid communication between the members is established. FIG. 1 is a sectional view showing the male member partially withdrawn from the female member. The male member comprises probe 45 with longitudinal bore 32 extending therethrough and poppet valve 60 slidably received in the bore. The male member also comprises handle 31 which is preferably threaded at 41 or otherwise connected to a manifold plate. The handle terminates at flange 42. One end of the male member bore has a threaded section 21 for connection to hydraulic lines. The probe of the male member also may have one or more steps on its outer circumference, if desired.

Preferably, poppet valve 60 includes a valve actuator 61 extending from the apex of the valve face. The poppet valve is urged into the closed position by poppet valve spring 71. The poppet valve spring is positioned between the poppet valve and spring collar 62. The spring collar is held in place by clip 63 which engages the bore 32 of the male member.

Female member 20 includes central bore 68, poppet valve 79 in the bore, and receiving chamber 67 for slidably receiving the male member therein. Poppet valve 79 has a conical valve face and a valve actuator 80 extending therefrom. Valve spring 78 urges the poppet valve into the closed position, and is anchored by spring collar 77 and clip 82. At one end of the female member body is handle 69 which preferably is threaded at 81 for connection to manifold plates and the like. One end of the female member bore 68 also is provided with a threaded section 76 for connection to hydraulic lines.

In a preferred embodiment, the receiving chamber 67 has a first circumferential shoulder 56 which may be used for positioning a seal. Preferably, the seal is a hollow radial metal seal 57 which forms a seal between the circumference of probe 45 and the central bore of the female member when the coupling is assembled. Seal 57 has an internal cavity which is expansible in response to hydraulic fluid pressure to enhance the radial seal between the probe section 45 and the female member. Alternatively, the seal may be an elastomeric radial seal such as an O-ring, a seal having a dovetail interfit between the shoulder 56 and the seal retainer 30, or a face-type seal for sealing with the leading face of the male member. The seal is held in place in the female member bore by seal retainer 30 which is preferably a sleeve-shaped member having an internal bore dimensioned to receive the probe section of the male member therethrough. The seal retainer 30 is held in place by retainer locking member 40 which preferably is threaded to the female member.

Seal retainer 30 is positioned on second circumferential shoulder 58 in the female member and may, if desired, provide slight axial compression to seal 57 to preload the seal. The outer diameter of the retainer is slightly less than the internal diameter 49 of the female member bore to form annulus 25 therebetween. The difference in these diameters should be sufficient to allow sliding insertion of the seal retainer into the female member bore, which will allow limited flow of seawater through the annulus. When the male member is partially withdrawn from the female member, seawater external to the coupling flows into bleed port 50, through annulus 25 and into the space in the receiving chamber vacated by the probe section of the male member.

Seal 54 is positioned on shoulder 55 of the retainer. Preferably, seal 54 is a hollow U-shaped elastomeric seal. The seal allows seawater to flow from the bleed port and through the annulus into the bore or receiving chamber of the female member, but blocks the flow of fluid from the receiving chamber or bore into the annulus and out of the coupling through the bleed port. Thus, sea water entering through radial bleed port 50 will flow through the annulus between seal retainer 30 and the female member into receiving chamber 67 when the male member is partially withdrawn from the female member, without leakage of hydraulic fluid from the coupling. Seal 57 also allows sea water to bleed through the annulus into the receiving chamber while preventing escape of hydraulic fluid out from the junction between the coupling members.

In a preferred embodiment, radial elastomeric seal 43 forms a seal between the male member probe section, seal retainer 30 and retainer locking member 40. The seal is preferably has a dovetail interfit between seal retainer and retainer locking member.

Optionally, additional bleed passages 52, 47, 53 may be included through the retainer 30 and retainer locking member. These additional bleed passages allow more sea water to bleed through the annular space 49 between the female member and seal retainer, and enter the receiving chamber when the male member has withdrawn partially out of the female member bore.

Now referring to FIG. 1A of the drawing, the bleed passage and seal are shown in more detail. When there is a vacuum in the receiving chamber or bore as the male member is withdrawn from the female member, the vacuum pulls water through bleed passage 50 and into gap or space 25 between the seal retainer 30 and the female member bore 49. Elastomeric seal 54 which is positioned on shoulder 55 allows the sea water to bleed past it into the bore or receiving chamber 67. Metal seal 57 which is positioned on shoulder 56 also allows the sea water to bleed past it when there is a vacuum in the receiving chamber. Optionally, bleed passages 52, 47, 53 may be used to allow additional seawater to bleed into the bore, if desired.

Figure 2:
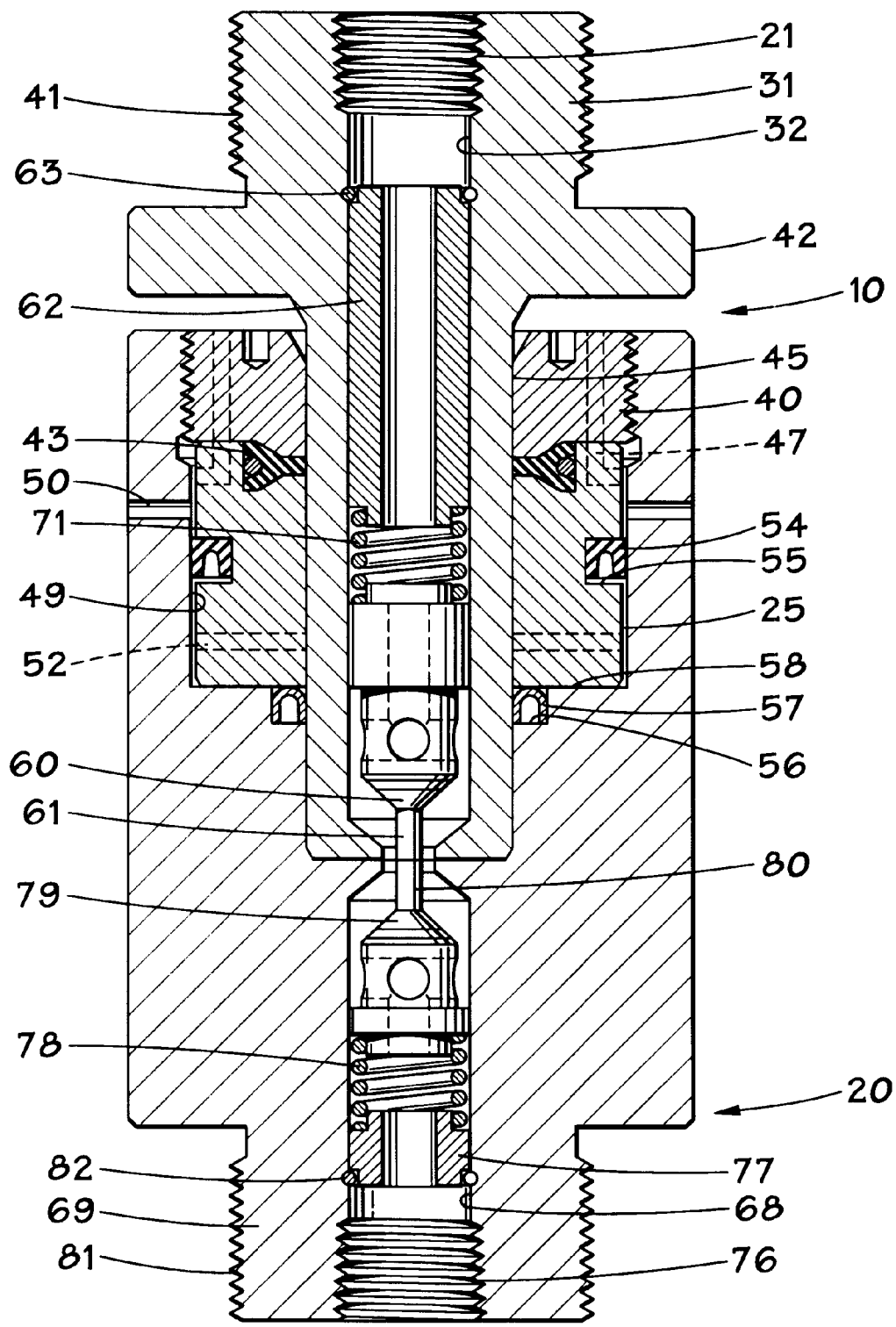
FIG. 2 is a sectional view of the male and female coupling members according to a first embodiment of the present invention with the male member fully inserted into the female member bore.

FIG. 2 shows the first embodiment with the male member fully inserted into the female member, the poppet valves of each member open, and hydraulic fluid transmitted between the coupling members. As shown, radial metal seal 57 and radial elastomeric seal 54 prevent hydraulic fluid from escaping between the male member, retainer and female member. Typically, hydraulic fluid in such a system is at pressures of 5,000 psi or more, which selves to pressure energize metal seal 57 and elastomeric seal 54. The pressure energization helps maintain a fluid tight seal to prevent the escape of hydraulic fluid. However, when the male member has withdrawn partially from the female member bore, creating a vacuum in the bore, sea water flows past seals 54 and 57, through the annulus between the coupling members. Accordingly, in a first embodiment, the bleed port is shown which allows sea water to bleed past the seal when the male is withdrawn from the female member, but that will prevent hydraulic fluid from leaking from the coupling. Preferably, bleeding of sea water into the female coupling bore occurs when the male member remains sealed radially with dovetail elastomeric seal 43. Preferably, the poppet valves and valve actuators are dimensioned to allow bleeding of sea water into the female member bore only after the valves of one or both members are closed.

Figures 3, 3A:
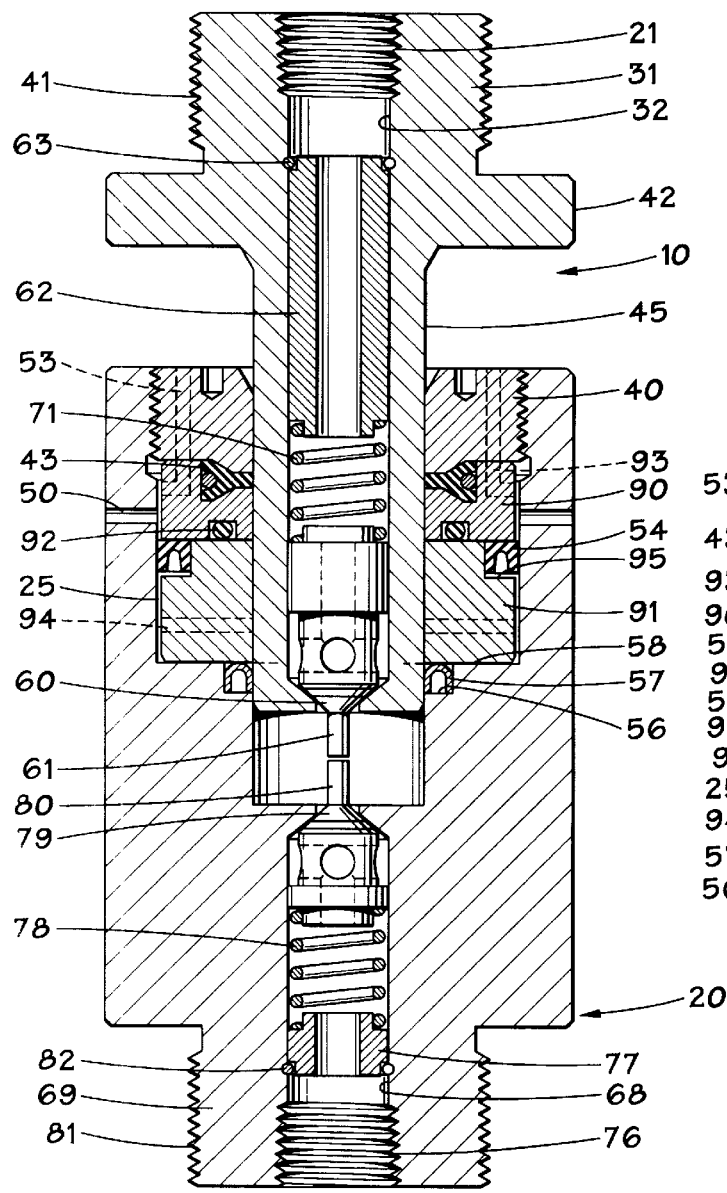
FIG. 3 is a sectional view of the male and female coupling members according to a second embodiment of the present invention with the male member partially removed from the female member bore.
FIG. 3A is a sectional view of the bleed port and seal according to a second preferred embodiment.

Now referring to FIG. 3 of the drawing, a second preferred embodiment is shown. In this embodiment, a two-piece seal retainer comprises first retainer part 90 and second retainer part 91. Seal 54 is seated on shoulder 95 of second part 91. In a preferred embodiment, an O-ring or other seal 92 is held in place between the first part and second part of the seal retainer. Bleed passage 25 extends between the receiving chamber and outer circumference of the female member. Optionally, additional bleed passage 94 may extend radially through the second part of the seal retainer, and bleed passage 93 may be included in the first part of the retainer, which communicates with bleed passage 53 in the retainer locking member 40. The other components of the second preferred embodiment are the same or similar to the first embodiment.

In FIG. 3A, a more detailed view of the coupling according to a second preferred embodiment is shown. The first part 90 and second part 91 of the retainer are both held in place by retainer locking member 53. The embodiment of FIG. 3 and FIG. 3A assists in positioning and assembly of elastomeric seal 92 on shoulder surface 95.

The bleed port of the present invention acts as a vacuum break to prevent a vacuum in the female member bore or receiving chamber as the male is being removed from the female member. The invention reduces the force necessary to remove the male from the female member, especially in subsea conditions and/or where multiple coupling members are simultaneously disconnected. The invention of the present invention may be used or incorporated into virtually any coupling which has elastomeric or metal seals or any combination thereof, but is most advantageous in subsea hydraulic couplings of the foregoing type.

Although variations of the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling comprising:
   (a) a male member having a cylindrical probe and a bore extending therethrough:
   (b) a female member having an outer surface, a stepped internal bore and a receiving chamber for slidably receiving the probe, the receiving chamber having an internal shoulder, a first ring-shaped seal positioned on the shoulder, and a seal retainer for holding the first ring-shaped seal on the shoulder, the seal retainer having an outer diameter smaller than the internal diameter of the receiving chamber to provide an annulus therebetween; and
   (c) a radial bleed passage extending between the receiving chamber and the outer surface of the female member, and a second ring-shaped seal positioned in the annulus between the seal retainer and the receiving chamber at a position axially spaced between the radial passage and the internal shoulder, the second ring-shaped seal configured to allow fluid outside the coupling to enter the radial passage and then flow through the annulus into the receiving chamber when the probe is partially withdrawn from the receiving chamber.

2. The undersea hydraulic coupling of claim 1 wherein the first ring-shaped seal is a pressure-energized hollow metal seal.

3. The undersea hydraulic coupling of claim 1 wherein the second ring-shaped seal is a U-shaped hollow elastomeric seal.

4. The undersea hydraulic coupling of claim 1 further comprising a poppet valve in the bore of the male member and a poppet valve in the bore of the female member, each of the poppet valves having a valve actuator to open the valves when the valve actuators are mutually engaged.

5. The undersea hydraulic coupling of claim 1 further comprising a retainer locking member engaged to the female member for holding the seal retainer in the female member receiving chamber.

6. The undersea hydraulic coupling of claim 1 further comprising a second radial bleed passage extending through the seal retainer.

7. An undersea hydraulic coupling comprising:
   (a) a female member having an outer circumference, a central bore and an internal shoulder in the central bore;
   (b) a first radial seal positioned on the internal shoulder and a seal retainer engaging the female member for retaining the radial seal on the internal shoulder, the seal retainer insertable into the central bore to form an annulus between the seal retainer and central bore;
   (c) a radial bleed port between the outer circumference of the female member and the central bore; and
   (d) a second radial seal positioned in the annulus and engageable with the seal retainer, the second radial seal configured to block fluid flow from the central bore to the bleed port.

8. The undersea hydraulic coupling of claim 7 further comprising a second internal shoulder in the central bore of the female member, the seal retainer positioned to abut the second internal shoulder.

9. The undersea hydraulic coupling of claim 7 further comprising a retainer locking member engageable with the female member to hold the seal retainer in the central bore.

10. The undersea hydraulic coupling of claim 9 further comprising an elastomeric seal having a dovetail interfit between the seal retainer and retainer locking member.

11. The undersea hydraulic coupling of claim 7 further comprising a poppet valve in at least one of the male and female coupling members.

12. The undersea hydraulic coupling of claim 7 further comprising a second bleed port in the seal retainer.

13. The undersea hydraulic coupling of claim 7 wherein the first radial seal is configured to block fluid flow from the central bore to the bleed port, and to allow fluid flow from the bleed port to the central bore.

14. An undersea hydraulic coupling comprising:
   (a) a male member having a valved central bore and a cylindrical probe;
   (b) a female member having a valved central bore with a plurality of steps therein, at least part of the central bore dimensioned to slidingly receive the cylindrical probe;
   (c) a first radial seal positioned on one of the steps in the central bore, the radial seal engaging the cylindrical probe of the male member when the male member is fully inserted into the central bore, a seal retaining member insertable into the central bore to abut one of the steps in the central bore and to hold the first radial seal in the central bore, and a retainer locking member engaged to the female member to hold the seal retainer in place; and (d) a bleed port to allow fluid outside the female member to flow into the central bore, and a second radial seal allowing fluid entering through the bleed port to flow into the central bore when the cylindrical probe disengages the first radial seal as the male member is partially withdrawn from the female member.

15. The undersea hydraulic coupling of claim 14 wherein the second radial seal restricts fluid flow from the central bore of the female member to the bleed port.

16. The undersea hydraulic coupling of claim 14 wherein the seal retainer comprises a first section and a second section, and the second radial seal is positioned between the first and second sections.

17. The undersea hydraulic coupling of claim 14 further comprising a second bleed port extending radially through the seal retainer.

18. The undersea hydraulic coupling of claim 14 wherein the bleed port extends through the female member into the central bore.

19. The undersea hydraulic coupling of claim 14 wherein the bleed port extends through the female member and through the seal retainer into the central bore.

* * * * *